G. S. TIFFANY.
TAILOR'S MEASURING DEVICE.
APPLICATION FILED MAR. 24, 1909.
932,649.
Patented Aug. 31, 1909.
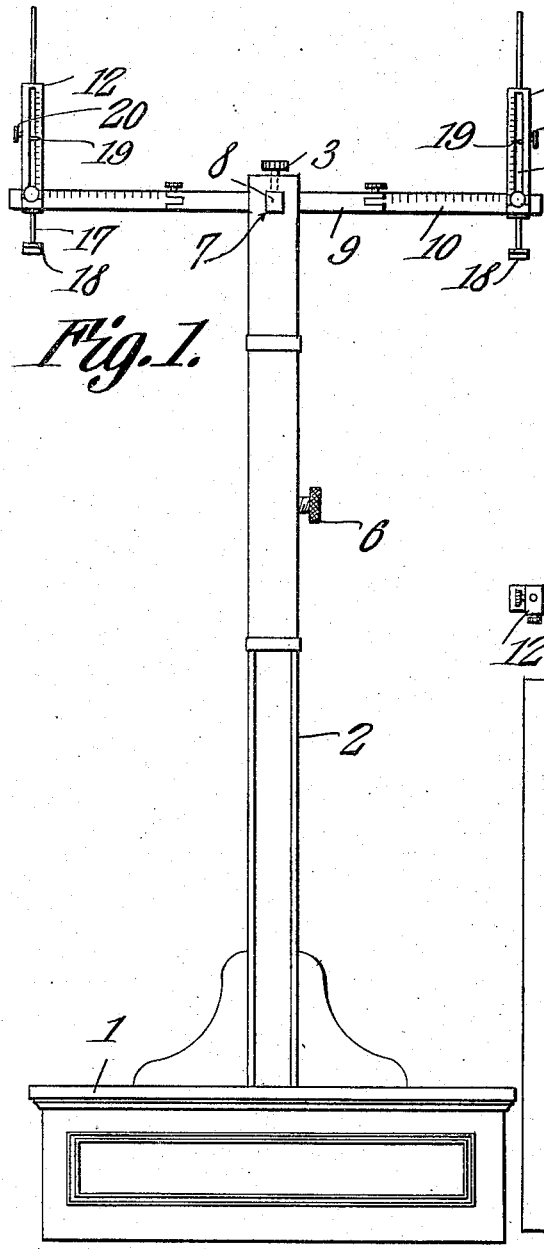
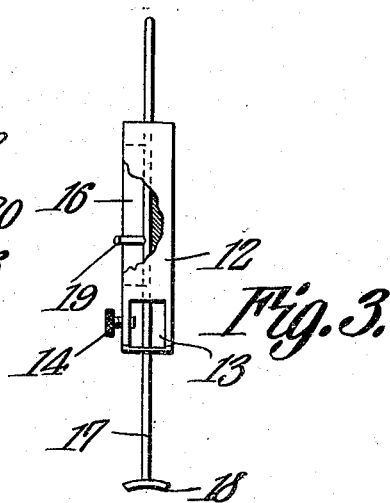
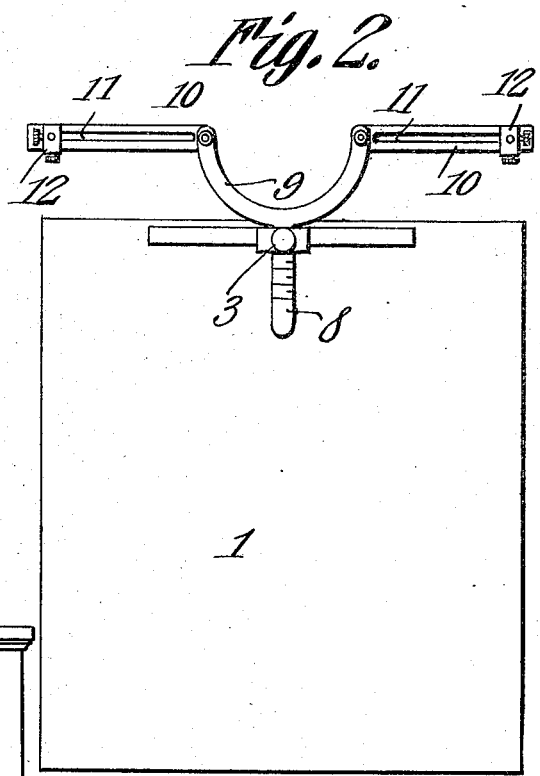
Witnesses
Inventor
George S. Tiffany.
By C. A. Snow & Co.
Attorneys

UNITED STATES PATENT OFFICE.

GEORGE S. TIFFANY, OF HUTCHINSON, KANSAS.

TAILOR'S MEASURING DEVICE.

932,649. Specification of Letters Patent. Patented Aug. 31, 1909.

Application filed March 24, 1909. Serial No. 485,443.

*To all whom it may concern:*

Be it known that I, GEORGE S. TIFFANY, a citizen of the United States, residing at Hutchinson, in the county of Reno and State of Kansas, have invented a new and useful Tailor's Measuring Device, of which the following is a specification.

This invention relates to measuring apparatus for use in tailoring and is more especially designed for use as a means for obtaining the slant of the shoulders and for accurately indicating any difference in the elevations of the shoulders of a customer.

Heretofore, in taking the measurements of a person it has been difficult to accurately determine and indicate any variations in the slant of the shoulders of a customer and, as a result, it has been found extremely difficult to accurately fit slightly deformed persons, especially when the cutters and fitters receive their orders by mail.

The object of the present invention is to provide a simple form of apparatus by means of which any variation in the slant of the shoulders of a customer can be accurately determined, the same apparatus being also useful for indicating the height of a customer and the distance between the shoulder points.

With these and other objects in view the invention consists of certain novel details of construction and combination of parts hereinafter more fully described and pointed out in the claims.

In the accompanying drawings the preferred form of the invention has been shown.

In said drawings:—Figure 1 is a front elevation of measuring apparatus embodying the present improvements. Fig. 2 is a plan view thereof. Fig. 3 is an enlarged view, partly in elevation and partly in section of one of the sliding gages of the apparatus.

Referring to the figures by characters of reference, 1 designates a base or platform from which extends an extensible standard 2. It is to be understood of course that any suitable arrangement of graduations may be placed upon the extensible standard 2, any suitable means, such as a set screw 6, being utilized for holding the standard extended.

An opening 7 extends transversely through the upper member of standard 2 and receives a stem 8 projecting radially from the middle portion of a semi-circular yoke 9. The standard 2 has a set screw 3 in its upper end that extends thereinto and bears upon the stem. Arms 10 are pivotally connected to and extend from the ends of this yoke and are provided with longitudinal slots 11. These arms are suitably graduated and slidably mounted upon each of them is a gage strip 12 having a transverse opening 13 in the lower ends thereof for the reception of one of the arms 10. A set screw 14, or any other suitable clamping means extends through one wall of each of these openings 13 and is designed to bind upon the arm 10 so as to hold the gage strip in adjusted position upon the arm.

An opening 15 extends longitudinally through the gage strips 12 and registers with a corresponding longitudinal groove 16 in one face of the strip, this opening constituting a guide-way for a spindle 17, the lower end of which has a foot 18. An index 19 extends from the spindle and through the groove 16, said index coöperating with a series of graduations arranged upon one face of the gage strip. A set screw 20 or other suitable clamping device is arranged in one wall of the gage strip and serves to bind upon the spindle 17 so as to prevent movement thereof.

In using the apparatus herein described the person to be measured stands upon the floor and close to the standard 2, and said standard is adjusted vertically so as to bring the yoke 9 into position back of the neck with the arms 10 extending directly over the shoulders. It is of course to be understood that the center of the yoke 9 is to be located directly at the back of the neck at the collar button and the gage strip 12 can then be adjusted along the arms 10 until the feet 18 of the spindles 17 are in position directly above the points of the shoulders. The graduations indicated on the arms 10 by the strips 12 will designate the distances of the shoulder points from the center of the neck, and, by releasing the spindles 17, they will drop until the feet 18 rest upon the points of the shoulders. The index 19 carried by these spindles will thus coöperate with the graduations on the strips 12 to indicate the distances of the shoulder points from the horizontal line occupied by the arms 10. Not only can the two measurements referred to thus be obtained but the exact angle or slant of the shoulders can be readily determined by extending a straight edge from the foot 18 of each spindle to the center of the yoke.

To measure the height of the person the yoke is adjusted vertically until it rests lightly upon the top of the head.

By pivotally mounting the arms 10 either can be swung forward should one shoulder be farther to the front than the other. The platform is designed to hold a person while being measured for trousers. As the stem 8 is slidably mounted within the standard it will be apparent that the neck-receiving yoke 9 can be adjusted forwardly or backwardly so as to accurately indicate in inches and fractions thereof any forward incline of the neck and shoulders.

It is of course to be understood that various changes may be made in the construction and arrangement of the parts without departing from the spirit or sacrificing any of the advantages of the invention.

What is claimed is:—

1. Measuring apparatus of the class described comprising a supporting structure, a neck-receiving yoke carried thereby, members pivotally connected to the yoke, and means vertically and horizontally adjustable upon said members for indicating the distance between shoulder points and the elevation of said points.

2. A measuring apparatus of the class described comprising a supporting structure, a neck-receiving member carried thereby, oppositely extending arms pivoted upon said member, gage strips adjustably mounted upon the arms and coöperating therewith for indicating the distance between shoulder points, and means carried by each gage strip and coöperating therewith for indicating the distance between a shoulder point and the pivoted arm.

3. Measuring apparatus of the class described comprising a supporting structure, a neck-receiving yoke carried thereby, pivoted arms extending from the yoke, gage strips slidably mounted on the arms, spindles slidable within and longitudinally of the gage strips, and coöperating means upon the spindles and gage strips for indicating distances between one end of the spindles and the gage strips.

4. Measuring apparatus of the class described comprising an adjustable standard, a neck-receiving yoke removably mounted thereon, pivoted arms extending from the yoke, said arms being slotted longitudinally, gage strips slidably mounted upon and extending perpendicularly to the arms, said strips coöperating to indicate the distance between shoulder points, spindles slidable longitudinally within the gage strips and extending through the slots in the arms, and coöperating means upon the spindles and gage strips for indicating the distances that the spindles project beyond the gage strips.

5. Measuring apparatus comprising a longitudinally extensible standard, a neck-receiving yoke removably mounted upon the standard, oppositely extending arms pivoted upon the yoke, and separate means carried by the arms for indicating the distance between shoulder points and the elevations of said points.

6. Measuring apparatus of the class described comprising a standard, a neck-receiving yoke removably mounted upon the standard, oppositely extending arms upon the yoke, said arms being slotted longitudinally, gage strips slidably mounted upon the arms, spindles slidable longitudinally within the strips and extending through the slots, each spindle having a foot at one end, means for locking the spindles against movement within the strips, and coöperating means upon the spindles and strips for indicating the distances between the feet and the strips.

In testimony that I claim the foregoing as my own, I have hereto affixed my signature in the presence of two witnesses.

GEORGE S. TIFFANY.

Witnesses:
J. M. JORDAN,
CHAS. S. FULTON.